United States Patent
Nishimura (10) Patent No.: US 10,859,671 B2
(45) Date of Patent: Dec. 8, 2020

(54) POSITION ESTIMATION APPARATUS AND POSITION ESTIMATION METHOD

(71) Applicant: Murata Manufacturing Co., Ltd., Kyoto (JP)

(72) Inventor: Tetsu Nishimura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/404,933

(22) Filed: May 7, 2019

(65) Prior Publication Data

US 2019/0257917 A1 Aug. 22, 2019

Related U.S. Application Data

(63) Continuation of application No. PCT/JP2017/036655, filed on Oct. 10, 2017.

(30) Foreign Application Priority Data

Nov. 29, 2016 (JP) ................................ 2016-231688

(51) Int. Cl.
*G01S 5/14* (2006.01)
*G01S 5/02* (2010.01)

(52) U.S. Cl.
CPC .............. *G01S 5/14* (2013.01); *G01S 5/0221* (2013.01); *G01S 5/0284* (2013.01)

(58) Field of Classification Search
CPC . G01S 5/12; G01S 5/14; G01S 5/0284; G01S 5/0221; G01S 5/10
See application file for complete search history.

(56) References Cited

U.S. PATENT DOCUMENTS

| 2007/0052534 A1 | 3/2007 | Bird et al. |
| 2008/0042898 A1* | 2/2008 | Sharma ................. G01S 5/0284 342/450 |
| 2012/0056786 A1* | 3/2012 | Pandey ..................... G01S 5/14 342/463 |
| 2014/0004878 A1 | 1/2014 | Park et al. |
| 2014/0112375 A1 | 4/2014 | Enge et al. |

(Continued)

FOREIGN PATENT DOCUMENTS

| JP | 2007-508773 A | 4/2007 |
| JP | 2009-210582 A | 9/2009 |

(Continued)

OTHER PUBLICATIONS

International Search Report for International Application No. PCT/JP2017/036655 dated Jan. 9, 2018.

(Continued)

*Primary Examiner* — Marc Anthony Armand
(74) *Attorney, Agent, or Firm* — Pearne & Gordon LLP (57) ABSTRACT

A position estimation apparatus includes receivers that are disposed at different known positions and are configured to measure a reception intensity of a radio wave emitted from a mobile object and a calculator configured to sequentially perform, for each target receiver that is one of the receivers, processing for updating an estimated position of the mobile object such that the estimated position is closer to a presence circle having a center at the target receiver and a radius based on a reception intensity measured by the target receiver.

12 Claims, 7 Drawing Sheets

(56) References Cited

U.S. PATENT DOCUMENTS

2015/0097732 A1* 4/2015 Hill ............... G01S 5/0294
342/465
2016/0370453 A1* 12/2016 Boker ............... G01S 5/06

FOREIGN PATENT DOCUMENTS

| JP | 2012-173070 A | 9/2012 |
| JP | 2012-255673 A | 12/2012 |
| JP | 2016-503492 A | 2/2016 |

OTHER PUBLICATIONS

Written Opinion for International Application No. PCT/JP2017/036655 dated Jan. 9, 2018.

\* cited by examiner

POSITION ESTIMATION APPARATUS AND POSITION ESTIMATION METHOD

This is a continuation of International Application No. PCT/JP2017/036655 filed on Oct. 10, 2017 which claims priority from Japanese Patent Application No. 2016-231688 filed on Nov. 29, 2016. The contents of these applications are incorporated herein by reference in their entireties.

BACKGROUND

Technical Field

The present disclosure relates to mobile object position estimation apparatuses and mobile object position estimation methods, and, more particularly, to a technique for estimating the position of a mobile object on the basis of reception intensities of radio waves emitted from the mobile object at a plurality of fixed stations.

There is a technique called trilateration for measuring the distance from each of a plurality of fixed stations whose positions are known to a mobile object and specifying the position of the mobile object on the basis of the measured distances. The distance from the fixed station to the mobile object is measured on the basis of, for example, the reception intensity (received signal strength indicator (RSSI)) of radio waves that are emitted from one of the fixed station and the mobile object and received by the other one of them.

Figure 1:
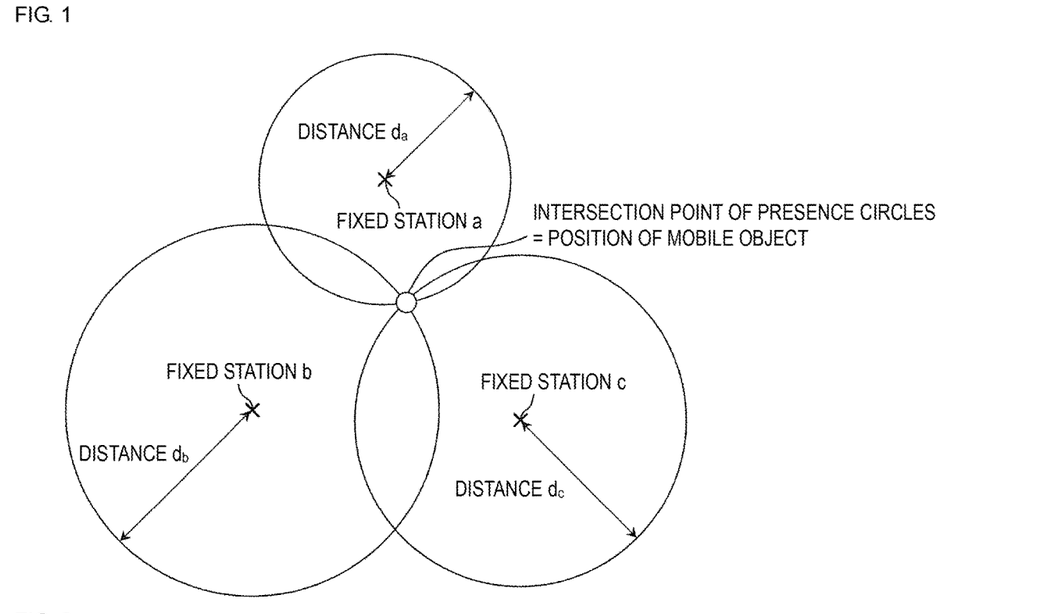
FIG. 1 is a diagram describing a basic way of thinking about trilateration.

FIG. 1 is a diagram describing a basic way of thinking about trilateration. As illustrated in FIG. 1, in trilateration, an intersection point of three circles (hereinafter referred to as presence circles) is determined as the estimated position of a mobile object. One of the circles has a center at a fixed station a and a distance $d_a$ from the fixed station a to the mobile object as a radius. Another one of the circles has a center at a fixed station b and a distance $d_b$ from the fixed station b to the mobile object as a radius. The other one of the circles has a center at a fixed station c and a distance $d_c$ from the fixed station c to the mobile object as a radius.

In actual trilateration, since the distances $d_a$, $d_b$, and $d_c$ include measurement errors, the three presence circle do not necessarily intersect one another at a single point. A calculation processing for refining and specifying the estimated position of the mobile object is therefore required. In particular, in position estimation in which the RSSI is used for the measurement of a distance, the application of various pieces of calculation processing is considered because the fluctuation in RSSI is large and the accuracy of estimation of a distance is low (see, for example, Patent Documents 1 and 2).

In Patent Document 1, the estimated position of a mobile object is refined in an overlap portion among a plurality of annular domains that have centers at different fixed stations and are specified by the minimum and maximum distances based on the RSSI. The estimated position of the mobile object is further refined in a region where the differences in distance from each of the fixed stations to the mobile object, which are calculated on the basis of the differences in RSSI, are generated.

In Patent Document 2, as the estimated position of a mobile object, an assumed position is set where an evaluation function based on an error between an RSSI calculated assuming that the mobile object is located at the assumed position and an actually measured RSSI is minimized. By representing, as the evaluation function, the total of errors between the RSSIs weighted for respective fixed stations on the basis of a radio wave environmental indicator, the importance of an RSSI error at a fixed station having a bad radio wave environment is reduced and the accuracy of the estimated position of the mobile object is improved.

Patent Document 1: Japanese Unexamined Patent Application Publication No. 2012-255673

Patent Document 2: Japanese Unexamined Patent Application Publication No. 2012-173070

BRIEF SUMMARY

However, in calculation processing in the related art, a computational load is high because the calculation processing includes calculation processing for geometrically refining a region and calculation processing for retrieving a point where the minimum evaluation function is obtained. For example, in a situation requiring a power saving such as the management of the positions of goods or persons in a facility, it is required that the position of a mobile object be calculated with a low computational load.

The present disclosure provides a position estimation apparatus and a position estimation method which estimate the position of a mobile object with a low computational load.

A position estimation apparatus according to an embodiment of the present disclosure includes a plurality of receivers that are disposed at different known positions and are configured to measure a reception intensity of a radio wave emitted from a mobile object and a calculator configured to sequentially perform, for each target receiver that is one of the receivers, processing for updating an estimated position of the mobile object such that the estimated position is closer to a presence circle having a center at the target receiver and a radius based on a reception intensity measured by the target receiver.

With this configuration, the estimated position of the mobile object can be brought closer to the presence circle having its center at the target receiver by simple calculation processing. By sequentially performing the processing for the respective target receivers, the estimated position of the mobile object is brought closer to an overlap region of presence circles having respective centers at the receivers and can be specified. As a result, a position estimation apparatus that estimates the position of a mobile object with a low computational load is obtained.

The processing for updating the estimated position of a mobile object using an RSSI at a single receiver is sequentially performed. Accordingly, even if there is the missing value of an RSSI at a receiver, the processing can be continued using an RSSI at another receiver. As a result, a position estimation apparatus is obtained that can be used in a situation where a radio wave environment is not stable and missing values frequently arise.

The calculator may update an estimated position of the mobile object such that the estimated position is closer to an intersection point of the presence circle and a straight line passing through the target receiver and a current estimated position of the mobile object.

With this configuration, the estimated position of the mobile object can be brought closer to the presence circle having its center at the target receiver by calculation processing for calculating the intersection point of the straight line passing through the mobile object and the target receiver and the presence circle.

The calculator may update an estimated position of the mobile object to an internally divided point of a segment having a current estimated position of the mobile object and the intersection point as both ends.

When an RSSI is increased for some reason, there is a case where a distance based on the RSSI becomes short and presence circles having respective centers at adjacent receivers are away from each other. In such a case, the estimated position of the mobile object is alternately set on the presence circles each time the update is performed. However, with the above-described configuration, a stable estimated position is obtained because the movement of the estimated position of the mobile object is suppressed.

The calculator may update an estimated position of the mobile object only in a case where a current estimated position of the mobile object is outside the presence circle.

When an RSSI is attenuated because of obstacles or multipath propagation, there is a case where the presence circle becomes very large. Even in such a case, a stable estimated position is obtained with the above-described configuration because the estimated position of the mobile object can be prevented from following an erroneous presence circle.

A position estimation method according to an embodiment of the present disclosure includes measuring, at a plurality of receivers disposed at different known positions, a reception intensity of a radio wave emitted from a mobile object and performing sequentially, for each target receiver that is one of the receivers, processing for updating an estimated position of the mobile object such that the estimated position is closer to a presence circle having a center at the target receiver and a radius based on a reception intensity measured by the target receiver.

With this configuration, the estimated position of the mobile object can be brought closer to the presence circle having its center at the target receiver by simple calculation processing. By sequentially performing the processing for the respective target receivers, the estimated position of the mobile object is brought closer to an overlap region of presence circles having respective centers at the receivers and can be specified. As a result, a position estimation method is obtained which estimates the position of a mobile object on the basis of an RSSI by calculation processing with a low computational load.

The processing for updating the estimated position of a mobile object using an RSSI at a single receiver is sequentially performed. Accordingly, even if there is the missing value of an RSSI at a receiver, the processing can be continued using an RSSI at another receiver. As a result, a position estimation method having an excellent resistance to radio interference is obtained.

According to the present disclosure, there can be provided a position estimation apparatus and a position estimation method which estimate the position of a mobile object with a low computational load.

DETAILED DESCRIPTION

Embodiments of the present disclosure will be described in detail below with reference to the drawings. Each of the embodiments to be described below represents a comprehensive or concrete example. The numerical values, shapes, materials, components, arrangement of components, coupling forms, steps, and order of steps to be described in the following embodiments are merely examples, and do not limit the present disclosure. Components not described in the independent claims among the components in the following embodiments are described as optional components. Also, the sizes or the ratio of sizes of the components illustrated in the drawings are not necessarily precise.

First Embodiment

A position estimation apparatus according to the first embodiment is an apparatus for measuring the reception intensities (hereinafter referred to as RSSIs) of radio waves emitted from a mobile object using a plurality of receivers disposed at different known positions and estimating the position of the mobile object on the basis of the measured RSSIs.

Figure 2:
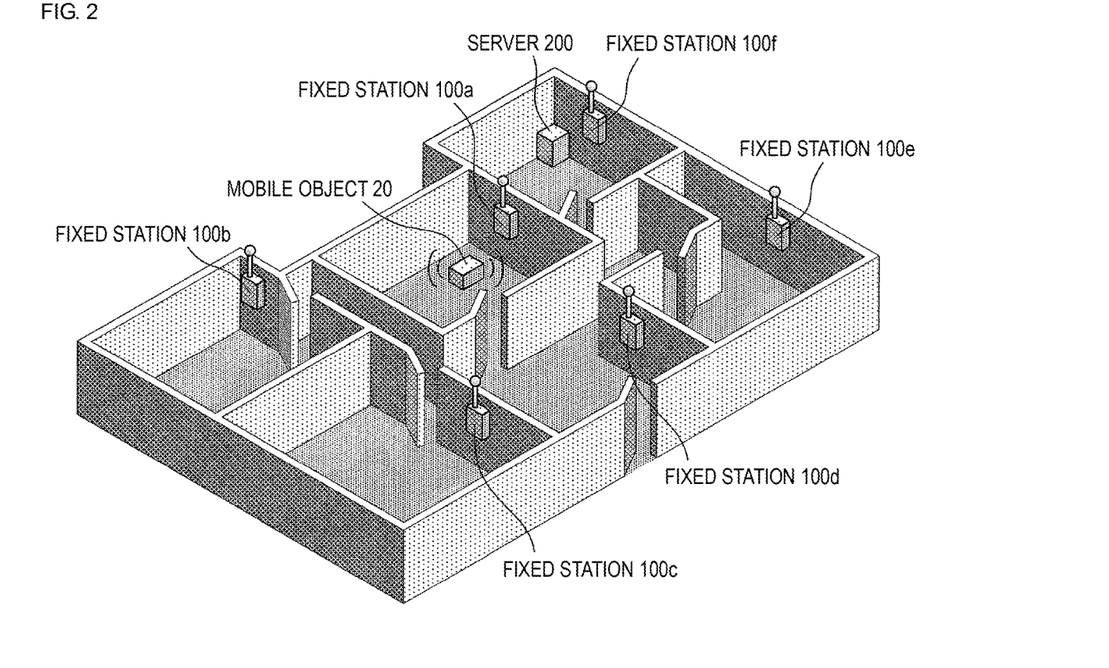
FIG. 2 is a conceptual diagram illustrating an example of a facility in which a position estimation apparatus is disposed.

FIG. 2 is a conceptual diagram illustrating an example of a facility in which a position estimation apparatus is disposed. As illustrated in FIG. 2, a transmitter for sending out a beacon is attached to a mobile object 20 whose position in a facility is to be detected. At positions determined in advance in the facility, fixed stations 100*a* to 100*f* and a server 200 constituting the position estimation apparatus are disposed.

The fixed stations 100*a* to 100*f* and the server 200 are communicably connected to one another via a communication network (not illustrated). Each of the fixed stations 100*a* to 100*f* measures the RSSI of a beacon emitted from the mobile object 20. The server 200 acquires data representing the RSSIs measured at the fixed stations via the communication network and estimates the position of the mobile object 20 on the basis of the RSSIs represented by the data.

Figure 3:
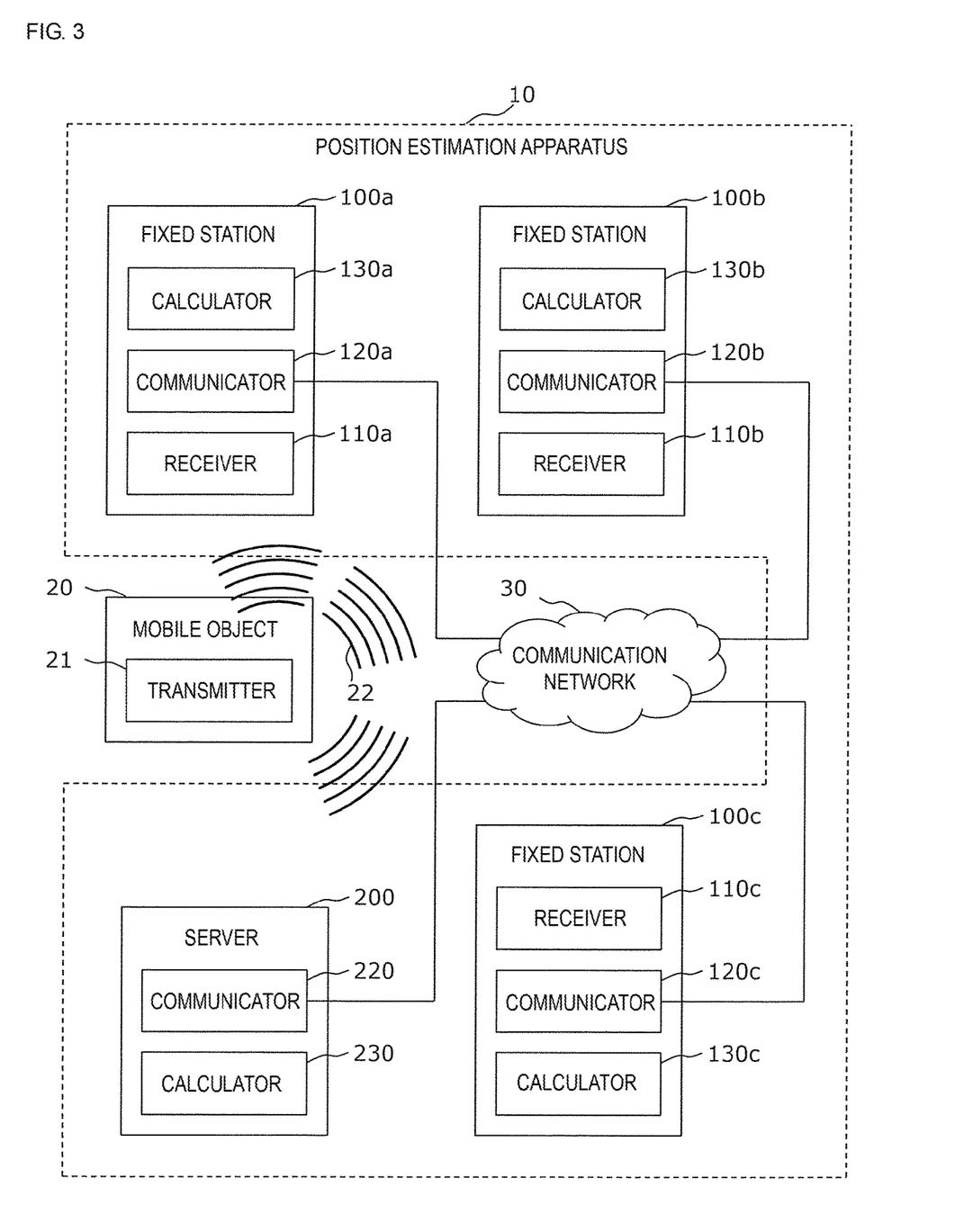
FIG. 3 is a block diagram illustrating an exemplary functional configuration of a position estimation apparatus according to a first embodiment.

FIG. 3 is a block diagram illustrating an exemplary functional configuration of a position estimation apparatus according to the first embodiment. In FIG. 3, for the simplification of the drawing, only the fixed stations 100*a*, 100*b*, and 100*c* and the server 200 in a position estimation apparatus 10 are illustrated. Along with the position estimation apparatus 10, the mobile object 20 and a communication network 30 are illustrated.

A transmitter 21 for sending out a beacon 22 is attached to the mobile object 20.

The transmitter 21 periodically sends out the beacon 22 with a predetermined transmission intensity which is a radio signal including identification information identifying the mobile object 20. The transmitter 21 may send out the beacon 22 at intervals of, for example, 0.1 to 1 second. The transmitter 21 may be an active RF tag used in radio-frequency identification (RFID). Alternatively, the transmitter 21 may be a radio device for sending out the beacon 22 in accordance with a near-field communication standard such as Zigbee®, Bluetooth®, or Low Energy in which power savings are achieved.

Since the fixed stations 100a, 100b, and 100c have the same configuration, only the fixed station 100a will be described below. In the fixed stations 100b and 100C, a letter "a" at the last reference numeral to be described below is read as letters b and c, respectively.

The fixed station 100a includes a receiver 110a, a communicator 120a, and a calculator 130a.

The receiver 110a is a radio device that operates in compliance with a radio communication standard that is in common with the transmitter 21. The receiver 110a receives the beacon 22 that is periodically sent out from the transmitter 21 and measures the RSSI of the beacon 22 each time it receives the beacon 22.

The communicator 120a is a communication device that communicably connects the fixed station 100a to the fixed stations 100b and 100c and the server 200 via the communication network 30. The communicator 120a notifies the server 200 via the communication network 30 of the RSSI of the beacon 22 measured by the receiver 110a. The communication network 30 may be a wired or wireless network. As the communicator 120a, a communication device suitable for the communication network 30 is used.

The communicator 120a may be, for example, a network adapter connected to a wired local area network (LAN). Alternatively, the communicator 120a may be a radio device that constitutes a wireless mesh network in compliance with a near-field communication standard such as Zigbee®, Bluetooth®, or Low Energy in which power savings are achieved. In a case where the communicator 120a performs radio communication in compliance with a radio communication standard that is the same as the radio communication standard for the beacon 22, a part or all parts of the communicator 120a and the receiver 110a may be used in common.

The calculator 130a is a controller for controlling the operation of the fixed station 100a.

The calculator 130a may be, for example, a one-chip microcomputer including a processor, a memory, and an input/output port. The calculator 130a may control the operation of the fixed station 100a using a software function realized by causing the processor to execute a program recorded in the memory.

The server 200 includes a communicator 220 and a calculator 230.

The communicator 220 is a communication device that communicably connects the server 200 to the fixed stations 100a, 100b, and 100c via the communication network 30.

The calculator 230 acquires the RSSI of the beacon 22 measured by each of the receivers 110a, 110b, and 110c via the communicator 220 and estimates the position of the mobile object 20 on the basis of the acquired RSSI.

The calculator 230 may be, for example, a general-purpose computer device in which a processor (not illustrated), a memory, and other components are connected to on another via a bus. The calculator 230 may perform the acquisition of the RSSI of the beacon 22 and the estimation of the position of the mobile object 20 using a software function realized by causing the processor to execute a program recorded in the memory.

Next, the operation of the position estimation apparatus 10 having the above configuration will be described.

Figure 4:
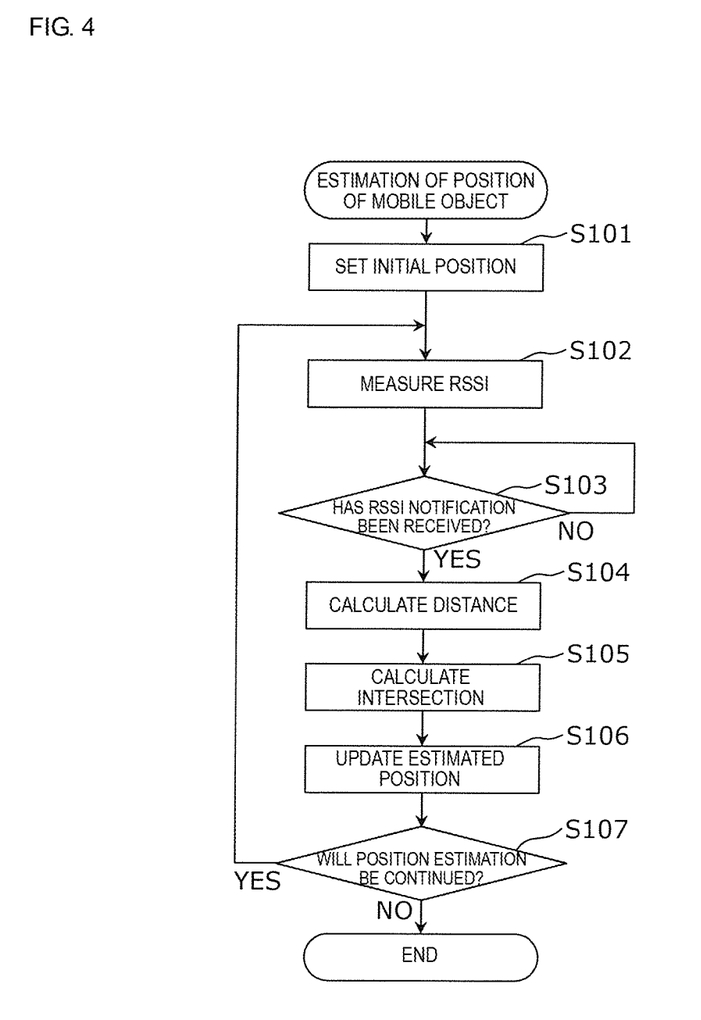
FIG. 4 is a flowchart illustrating an exemplary operation of a position estimation apparatus according to the first embodiment.

FIG. 4 is a flowchart illustrating an exemplary operation of the position estimation apparatus 10. The process illustrated in FIG. 4 is an example of a process for estimating the position of the mobile object 20 and starts, for example, at the time of the first reception of a beacon from the mobile object 20 that has entered a position detection area. The process illustrated in FIG. 4 may be concurrently performed for a plurality of respective mobile objects including the mobile object 20.

The server 200 sets the estimated position of the mobile object 20 to an initial position (S101). The initial position is optionally set and may be a point at a predetermined distance or more from all of the fixed stations 100a, 100b, and 100c.

Each of the fixed stations 100a, 100b, and 100c measures the RSSI of the beacon 22 and notifies the server 200 of data representing the measured RSSI (S102).

Upon receiving the data representing the RSSI (YES in S103), the server 200 performs the following process on the basis of the received data.

The server 200 calculates a distance based on the RSSI represented by the received data, that is, a distance from the fixed station from which the data has been received to the mobile object 20 (S104). For example, the server 200 may store correspondence information representing the relationship between an RSSI and a distance in the operational environment of the position estimation apparatus 10 in advance in the form of a mathematical expression or a numerical table and convert the RSSI into a distance with reference to the correspondence information. The correspondence information may be determined on the basis of actually measured values obtained in advance in the operational environment.

Figure 5:
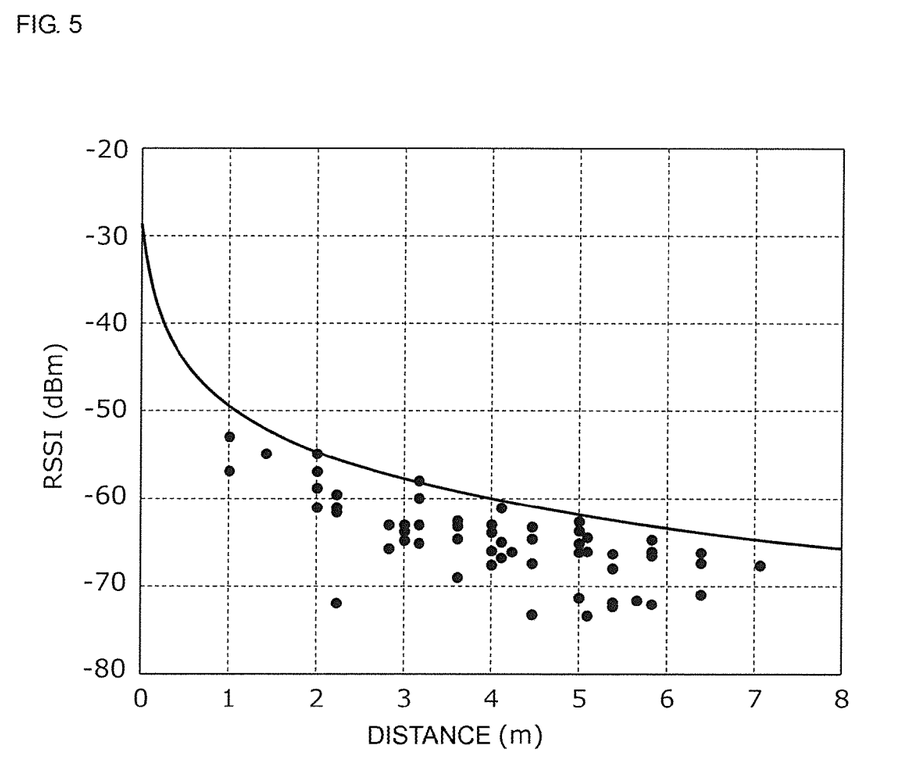
FIG. 5 is a graph illustrating an example of information about the correspondence between an RSSI and a distance.

FIG. 5 is a graph illustrating an example of the correspondence information. In FIG. 5, a horizontal axis represents a distance from a fixed station to a mobile object, a vertical axis represents the RSSI of a beacon measured by the fixed station, correspondence information is presented by a curve, and an actually measured value obtained in advance is represented by a dot. The correspondence information is determined by applying an RSSI-compliant physical expression to the maximum value of an actually measured value. Actually measured values include a very small value due to the influence of, for example, multipath propagation. Accordingly, by applying the physical expression to the maximum value of an actually measured value, correspondence information representing the relationship between an RSSI originally obtained in an operational environment and a distance is acquired. In the case of the example of correspondence information illustrated in FIG. 5, when the RSSI of −60 dBm is measured, the distance to a mobile object is calculated as 4 m.

Referring back to FIG. 4, the server 200, using the position of the fixed station (more specifically, a target receiver) that has measured the RSSI and the distance calculated on the basis of the RSSI, calculates the intersection point (hereinafter also referred to as a target point) between a straight line passing through the fixed station and a current estimated position and a presence circle (S105) and updates the estimated position of the mobile object 20 such that the estimated position is closer to the calculated intersection point (S106).

While the mobile object 20 is in the position detection area (YES in S107), the server 200 sequentially performs the process (S104 to S106) for updating the estimated position of the mobile object 20 each time it acquires an RSSI from one of the fixed stations 100a, 100b, and 100c (YES in S103).

Figure 6:
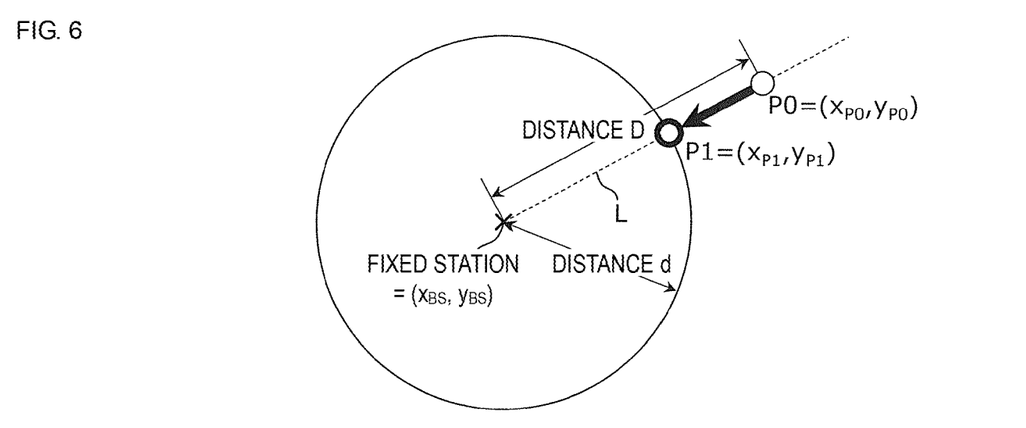
FIG. 6 is a diagram illustrating exemplary one piece of processing for updating an estimated position according to the first embodiment.

FIG. 6 is a diagram illustrating exemplary one piece of processing for updating an estimated position on the basis of an RSSI received from a single fixed station. In FIG. 6, the position of a fixed station is represented by coordinate values $(x_{BS}, y_{BS})$, the current estimated position P0 of a mobile object is represented by coordinate values $(x_{P0}, y_{P0})$, and the update target point P1 of the mobile object is represented by coordinate values $(x_{P1}, y_{P1})$. The current estimated position P0 illustrated in FIG. 6 corresponds to the initial position set in step S101 or the estimated position obtained each time the sequential processing is performed.

The server 200 calculates a distance d based on a RSSI with reference to, for example, the above-described correspondence information (see FIG. 5).

The server 200 calculates the target point P1 that is on a straight line L passing through the fixed station (target receiver) and the current estimated position P0 of the mobile object 20 and is at the distance based on an RSSI from the fixed station. Specifically, the coordinate values $(x_{P1}, y_{P1})$ of the target point P1 are calculated by $((d/D)x_{BS}+(1-d/D)x_{P0}, (d/D)y_{BS}+(1-d/D)y_{P0})$ where D represents the distance from the fixed station to the current estimated position P0.

The server 200 updates the estimated position of the mobile object 20 to the calculated target point P1.

The target point P1 is the intersection point of the straight line L and a presence circle having its center at the fixed station, that is, a shortest (nearest) point that is at the shortest (nearest) distance from the current estimated position P0 on the presence circle having its center at the fixed station. That is, the estimated position of the mobile object 20 is updated to the nearest point on the presence circle.

Thus, the estimated position of the mobile object 20 is updated by calculation processing with a low computational load in which only an internally divided point of a segment having the fixed station and the current estimated position P0 as both ends thereof is practically calculated.

FIG. 6 illustrates a case where the distance from the fixed station to the current estimated position P0 of the mobile object 20 is longer than the distance from the fixed station to the target point P1. The update of the estimated position of the mobile object 20 may be performed only in such a case, that is, a case where the current estimated position P0 is outside the presence circle. In a case where the current estimated position P0 is on or in the presence circle, the update of the estimated position may be forbidden.

By updating the estimated position only in a case where the current estimated position is outside the presence circle, the update of the estimated position to a target point on a very large presence circle erroneously set under the influence of the attenuation of an RSSI due to, for example, obstacles or multipath propagation can be prevented. As a result, a stable estimated position can be obtained.

The description of the processing for sequentially updating the estimated position of the mobile object 20 will be continued.

Figure 7A:
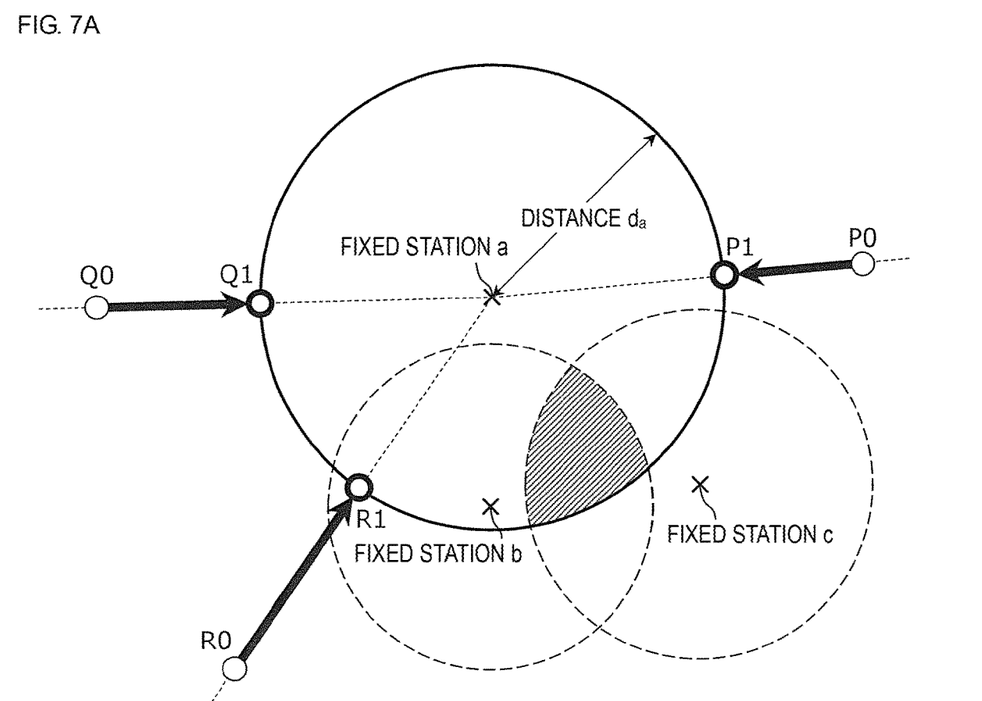
FIG. 7A is a diagram illustrating exemplary processing for sequentially updating an estimated position according to the first embodiment.
Figure 7B:
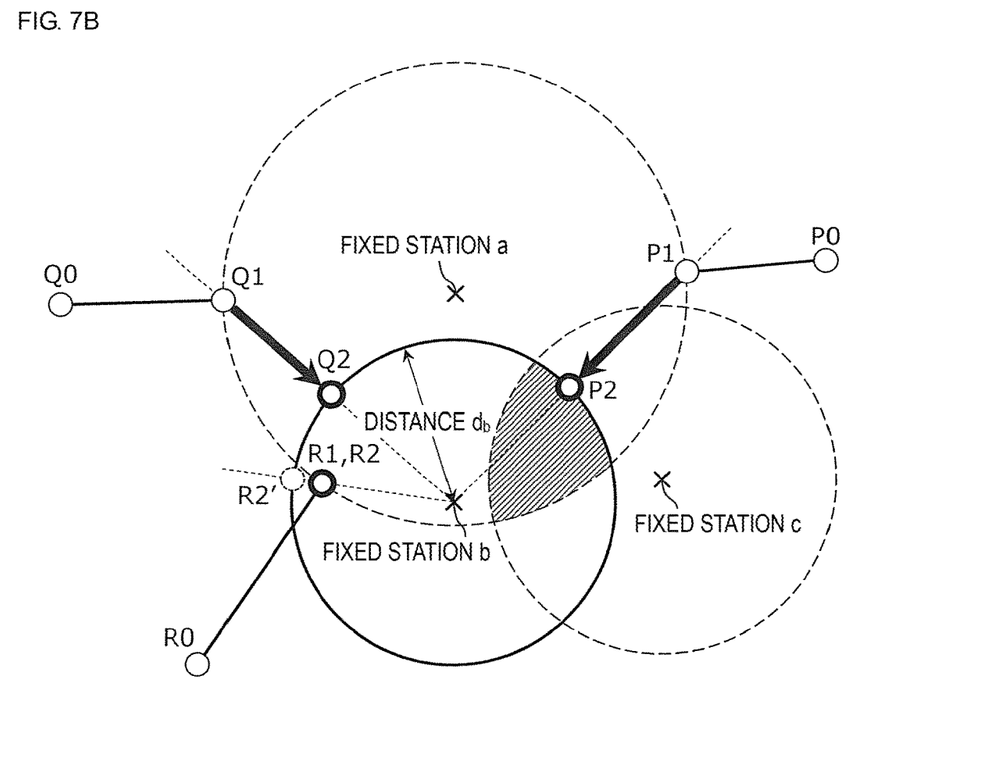
FIG. 7B is a diagram illustrating exemplary processing for sequentially updating an estimated position according to the first embodiment.
Figure 7C:
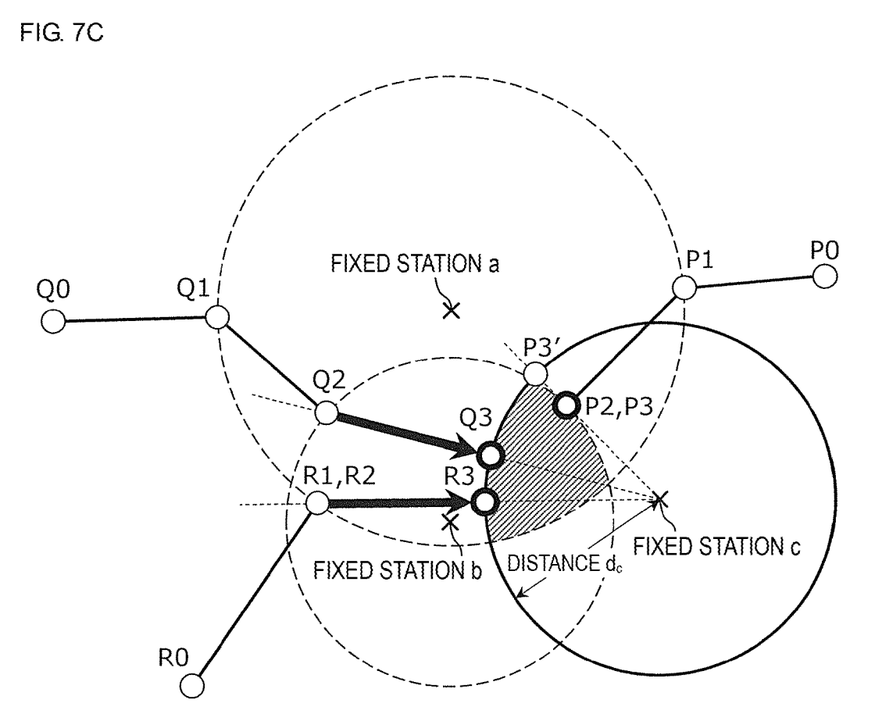
FIG. 7C is a diagram illustrating exemplary processing for sequentially updating an estimated position according to the first embodiment.

FIGS. 7A, 7B, and 7C illustrate examples of pieces of sequential update processing performed on the basis of RSSIs transmitted from the fixed stations a, b, and c, respectively. The fixed stations a, b, and c may correspond to, but not limited to, for example, the fixed stations 100a, 100b, and 100c illustrated in FIG. 3. In each of the FIGS. 7A, 7B, and 7C, in order to describe the fact that the estimated position of a mobile object converges in a presence circle overlap region (a hatched portion) regardless of an initial position, an exemplary case where the sequential update processing starts from different respective estimated positions P0, Q0, and R0 at the same time is illustrated.

In FIG. 7A, target points P1, Q1, and R1 are calculated for current estimated positions P0, Q0, and R0, respectively, on the basis of an RSSI at the fixed station a. The estimated positions P0, Q0, and R0 are updated to the calculated target points P1, Q1, and R1, respectively.

In FIG. 7B, target points P2, Q2, and R2' are calculated for current estimated positions P1, Q1, and R1, respectively, on the basis of an RSSI at the fixed station b. The estimated position R1 is in the presence circle having its center at the fixed station b, and the distance from the fixed station b to the current estimated position R1 is shorter than the distance from the fixed station b to the target point R2'. Accordingly, although the estimated positions P1 and Q1 are updated to the calculated target point P2 and Q2, respectively, the estimated position R1 is not updated and set as an estimated position R2 (=R1).

In FIG. 7C, target points P3', Q3, and R3 are calculated for current estimated positions P2, Q2, and R2, respectively, on the basis of an RSSI at the fixed station c. The estimated position P2 is in the presence circle having its center at the fixed station c, and the distance from the fixed station c to the current estimated position P2 is shorter than the distance from the fixed station c to the target point P3'. Accordingly, although the estimated positions Q2 and R2 are updated to the calculated target point Q3 and R3, respectively, the estimated position P2 is not updated and set as an estimated position P3 (=P2).

As is apparent from FIGS. 7A, 7B, and 7C, wherever the initial estimated position of a mobile object is located (P0, Q0, and R0), the estimated position of the mobile object is updated to a point in or on the contour of an overlap region of presence circles having respective centers at the fixed stations a, b, and c by performing the update processing a plurality of times.

As described above, each of the update processing is performed by practically calculating an internally divided point of a segment having a fixed station and a current estimated position as both ends thereof, and does not include calculation processing in the related art such as calculation processing for geometrically refining a region or calculation processing for retrieving a point where the minimum evaluation function is obtained.

Using the above-described position estimation apparatus, the position of a mobile object can be estimated by calculation processing with a low computational load.

Since the processing for updating the estimated position of a mobile object using an RSSI at a single receiver is sequentially performed, there is no need to wait until RSSIs at three or more receivers are obtained at the time of the update of the estimated position unlike in trilateration. Accordingly, even if there is the missing value of an RSSI at a receiver, the processing can be continued using an RSSI at another receiver.

As a result, a position estimation apparatus is obtained that can be used in a situation where a radio wave environment is not stable and missing values frequently arise. This position estimation apparatus is useful in a case where an industry science medical (ISM) band, in which much interference occurs, is used for, for example, the transmission of a beacon and data representing an RSSI.

The position estimation apparatus is also applicable to a situation where only one or two receivers are present around a mobile object in, for example, the end portion of a position detection area.

Second Embodiment

In the first embodiment, a target point is set on a presence circle and an estimated position is updated to the target point. With this configuration, in a case where an RSSI is increased for some reason and presence circles having respective centers at adjacent fixed stations are reduced in size and are away from each other, the estimated position is alternately set on the presence circles each time the update is performed.

Figure 8:
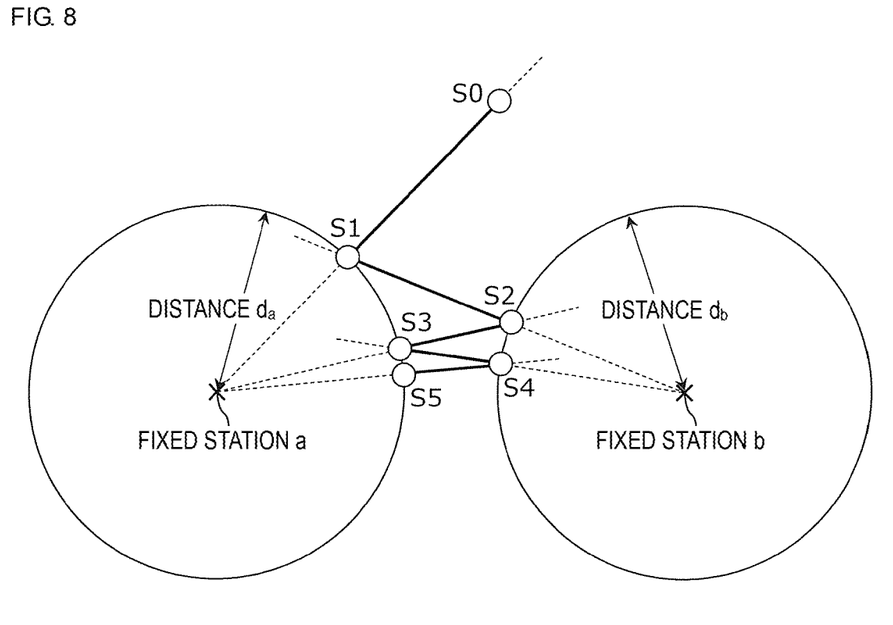
FIG. 8 is a diagram illustrating exemplary processing for sequentially updating an estimated position in a comparative example of a second embodiment.

FIG. 8 is a diagram illustrating exemplary processing for sequentially updating an estimated position in a comparative example of the second embodiment.

In FIG. 8, the initial estimated position is set to an estimated position S0. An RSSI at the fixed station a and an RSSI at the fixed station b are alternately used to update the estimated position. The estimated position is updated to the target point described in the first embodiment (the point that is at the nearest distance from a current estimated position on a presence circle).

As illustrated in FIG. 8, the estimated position is alternately set on presence circles having respective centers at the fixed stations a and b as estimated positions S1 to S5 each time the update is performed. Thus, a stable estimated position is not obtained.

The estimated position of the mobile object is therefore updated to an internally divided point of a segment having the current estimated position and the target point as both ends thereof.

Figure 9:
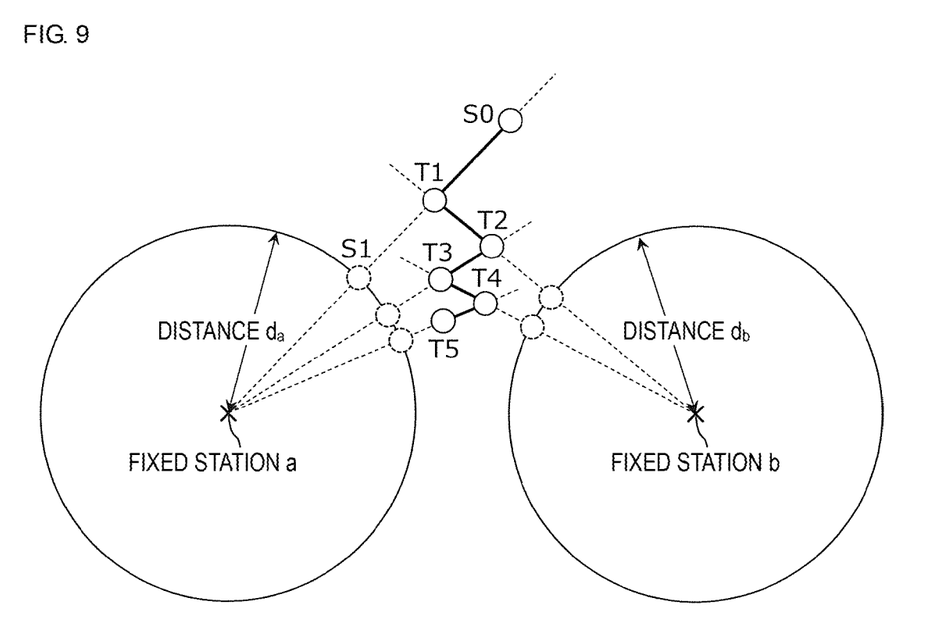
FIG. 9 is a diagram illustrating exemplary processing for sequentially updating an estimated position according to the second embodiment.

FIG. 9 is a diagram illustrating exemplary processing for sequentially updating an estimated position according to the second embodiment.

FIG. 9 differs from FIG. 8 in that an estimate position is updated to a midpoint that is an example of an internally divided point of a segment between the current estimated position and a target point (represented by a broken circle). In the initial update, the target point S1 is calculated for the current estimated position S0. The estimated position is updated to an estimated position T1 that is a midpoint of a segment between the estimated position S0 and the target point S1 (that is, an internally divided point when an internal division ratio is 1:1). Although detailed numerals are omitted, the update of the estimated position is similarly performed in the second and subsequent updates. The internal division ratio is not limited to 1:1 and may be selected as appropriate on the basis of the convergence speed of an estimated position and the suppression effect of movement of an estimated position.

As illustrated in FIG. 9, by updating the estimated position to the internally divided point (for example, a midpoint) of a segment between the current estimated position and the target point, the movement of the estimated position (T1 to T5) is suppressed and a more stable estimated position is obtained.

Although a position estimation apparatus and a position estimation method according to an embodiment of the present disclosure have been described, the present disclosure is not limited to each embodiment. Various modifications to the embodiments that can be conceived by those skilled in the art and forms configured by combining constituent elements in different embodiments may be included in the scope of one or more aspects of the present disclosure without departing from the teachings of the present disclosure.

INDUSTRIAL APPLICABILITY

The present disclosure can be widely used for the estimation of the position of a mobile object in, for example, the management of the positions of goods and persons in various facilities.

REFERENCE SIGNS LIST 10 position estimation apparatus
20 mobile object
21 transmitter
22 beacon
30 communication network
100a to 100f fixed station
110a to 110c receiver
120a to 120c communicator
130a to 130c calculator
200 server
220 communicator
230 calculator

The invention claimed is:

1. A position estimation apparatus comprising:
a plurality of receivers, each receiver being at a different known position and configured to measure a reception intensity of a radio wave emitted from a mobile object, each receiver defining a presence circle having a center at the corresponding receiver and a radius corresponding to the reception intensity measured by the corresponding receiver; and
a calculator configured to, for each receiver, sequentially update an estimated position of the mobile object such that the estimated position is closer to the presence circle of the corresponding receiver than a current estimation position.

2. The position estimation apparatus according to claim 1, wherein the estimated position is closer to an intersection point of the presence circle and a straight line than the current estimated position, the straight line passing through the receiver defining the presence circle and the current estimated position of the mobile object.

3. The position estimation apparatus according to claim 2, wherein the estimated position is a location on a segment that connects the current estimated position and the intersection point.

4. The position estimation apparatus according to claim 1, wherein the calculator is configured to update the estimated position only when the current estimated position is outside the presence circle.

5. The position estimation apparatus according to claim 2, wherein the calculator is configured to update the estimated position only when the current estimated position is outside the presence circle.

6. The position estimation apparatus according to claim 3, wherein the calculator is configured to update the estimated position only when the current estimated position is outside the presence circle.

7. A position estimation method comprising:
measuring, at a plurality of receivers, a reception intensity of a radio wave emitted from a mobile object, each receiver defining a presence circle having a center at the corresponding receiver and a radius corresponding to the reception intensity measured by the corresponding receiver; and for each receiver, sequentially updating an estimated position of the mobile object such that the estimated position is closer to the presence circle of the corresponding receiver than a current estimation position.

8. The position estimation method according to claim 7, wherein the estimated position is closer to an intersection point of the presence circle and a straight line than the current estimated position, the straight line passing through the receiver defining the presence circle and the current estimated position of the mobile object.

9. The position estimation method according to claim 8, wherein the estimated position is an internally divided point of a segment, the segment being between the current estimated position and the intersection point.

10. The position estimation method according to claim 7, wherein the estimated position is updated only when the current estimated position is outside the presence circle.

11. The position estimation method according to claim 8, wherein the estimated position is updated only when the current estimated position is outside the presence circle.

12. The position estimation method according to claim 9, wherein the estimated position is updated only when the current estimated position is outside the presence circle.

* * * * *